Feb. 7, 1939.   L. J. BISHOP   2,146,616
UNLOADING ARM
Filed Dec. 9, 1936   2 Sheets-Sheet 1

INVENTOR
LEONARD J. BISHOP
BY
ATTORNEYS

Feb. 7, 1939.  L. J. BISHOP  2,146,616
UNLOADING ARM
Filed Dec. 9, 1936  2 Sheets-Sheet 2

INVENTOR
LEONARD J. BISHOP
BY
ATTORNEYS

Patented Feb. 7, 1939

2,146,616

UNITED STATES PATENT OFFICE 2,146,616

UNLOADING ARM

Leonard J. Bishop, Detroit, Mich., assignor to Mechanical Handling Systems, Inc., Detroit, Mich., a corporation of Michigan Application December 9, 1936, Serial No. 115,042

11 Claims. (Cl. 198—27)

This invention relates to transfer mechanism and more particularly to a device for transferring articles from one conveyor to another and at the same time changing the angular relation of the article with respect to the conveyor. More in detail, the invention comprises an oscillating arm designed to remove boards or similar flat articles from a support, which may be a conveyor, on which the boards are supported, and elevate the boards for deposition on a second support, which may also be a conveyor, and in a plane disposed at an angle to that in which the boards are carried by the first mentioned support.

In the drying of hides, it is customary to move the boards on which the hides are tacked with their faces lying in a horizontal plane to permit workmen to position and secure the hides on the boards. The boards are later carried through an oven, usually supported in vertical position on an oven conveyor. It is to a conveying system of this character that the present invention is particularly applicable.

One of the objects of the invention is to remove articles from a moving conveyor in timed relation thereto. Another object is to tilt the boards after removal from the conveyor to position them vertically on a second conveyor. Still another object of the invention is the provision of means on the second conveyor designed to insure removal of the board from the transfer means after it has been elevated to vertical position. Other objects will be apparent from the following description, taken in connection with the accompanying drawings, in which Fig. 1 is a plan view of one end of a horizontal conveyor and an adjacent section of transverse conveyor, the transfer mechanism being shown associated therewith;

Figure 1:
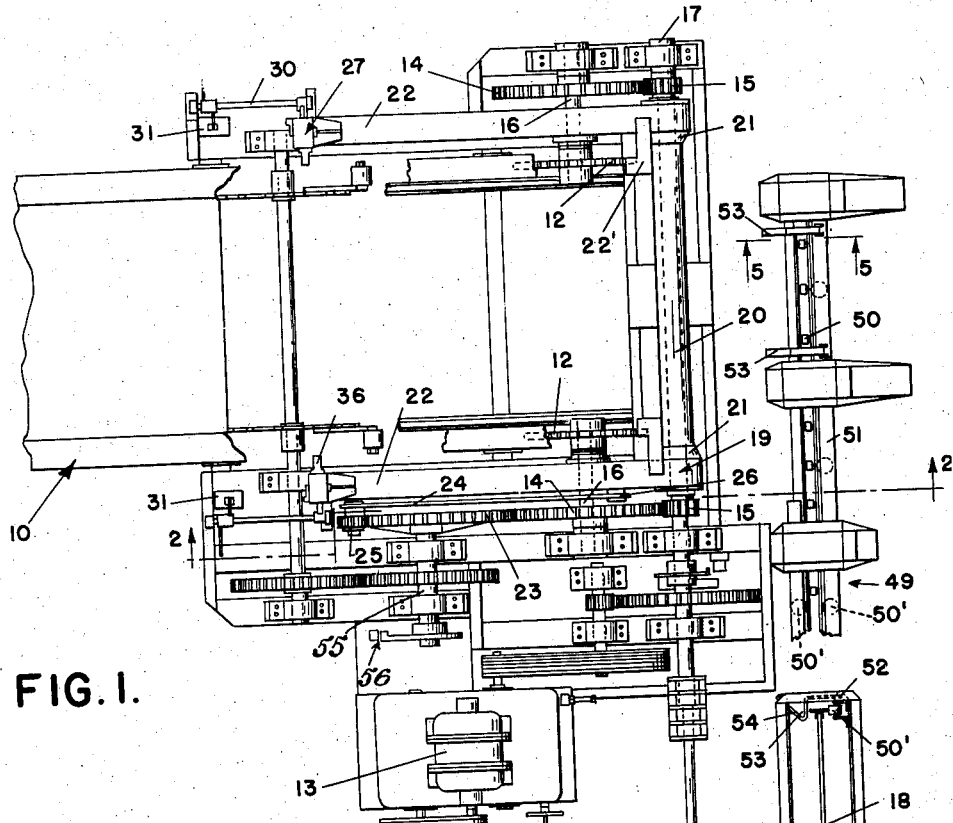
Figure 2:
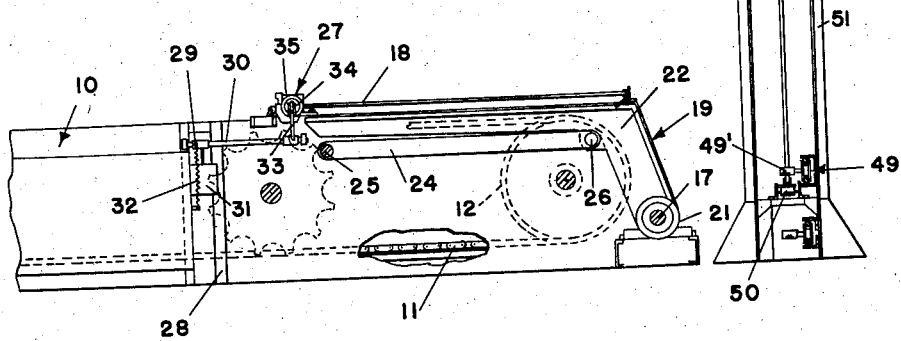
Fig. 2 is a section taken on line 2—2 of Fig. 1.

In the drawings, the main conveyor is indicated at 10 and comprises an endless chain 11 meshing with sprockets at each end of the conveyor frame, two of the sprockets being shown at 12. Motor 13 drives the sprockets through suitable gearing, including gears 14, 15 on shafts 16, 17 respectively. Conveyor 10 is designed to support and carry flat boards such as the one indicated at 18, with the faces thereof in horizontal position thereon.

Pivoted for oscillation about shaft 17 is a transfer device 19 comprising a tubular connecting member 20, to each end of which is secured by welding or otherwise a bearing housing 21 to which in turn are secured a pair of substantially L-shaped arms 22. The long leg of each of the arms is substantially the length of one of the boards and has guide members 22' secured thereon. The means for oscillating the transfer arms comprises a gear 23 and connecting rod 24, one end of the latter being pivotally connected to pin 25 on gear 23, and the other end being pivoted to one of the arms 22 at 26.

Figure 3:
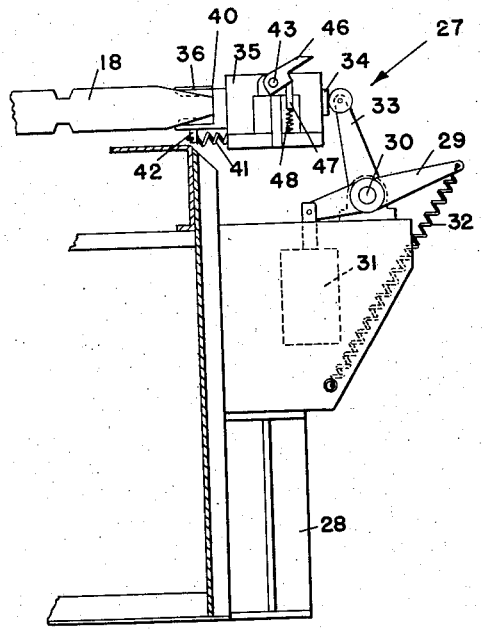
Fig. 3 is an enlarged fragmentary view, partly in section, of one end of the transfer device showing board engaging means thereon.
Figure 5:
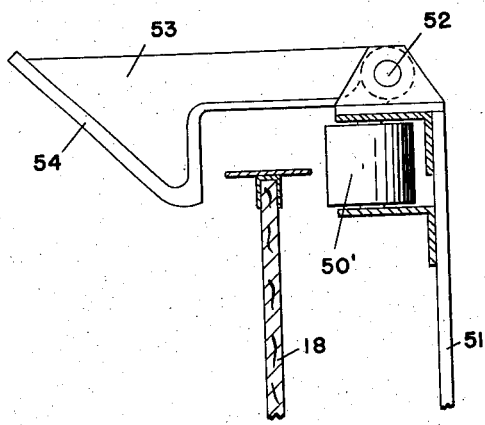
Fig. 5 is an enlarged section taken on line 5—5 of Fig. 1.

Adjacent one end of each arm 22 is a board clamping device indicated generally at 27. Mounted on frame 28 of the conveyor 10 at each side thereof is a lever 29 secured to shaft 30. One end of the lever is connected to a solenoid 31 on the frame and the other end thereof is normally pulled downwardly by spring 32 connected to the frame and lever. Also fast on shaft 30 is an arm 33 which is adapted to engage a plunger 34 slidably mounted in housing 35. The plunger is formed at one end with a pair of jaws 36 adapted to engage the edge of a board as shown in Fig. 3.

Figure 4:
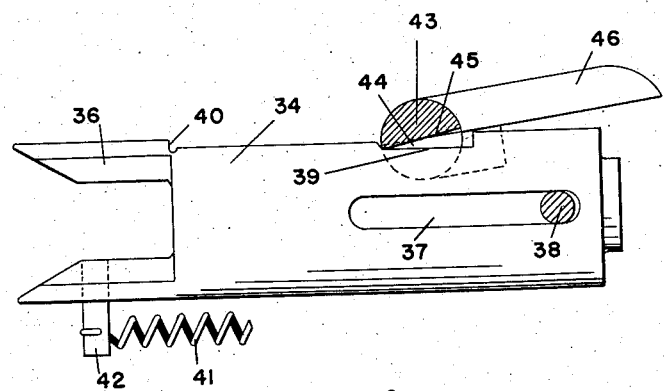
Fig. 4 is an enlarged section through the board engaging device.

Referring to Fig. 4, it will be seen that plunger 34 is provided with an elongated transverse slot 37 cooperating with pin 38 on housing 35 to preclude rotation of the plunger. The upper side of the plunger is notched at 39 and has a shoulder 40 adjacent jaws 36. Normally the plunger is held in retracted position by spring 41 fastened at one end to the housing and at the other end to a pin 42 on the plunger. Mounted for oscillation in the housing is a cross pin 43 having a recess 44 intermediate its ends to form a flat face 45 on the pin, in a substantially diametral plane. Secured to pin 43 is a pawl member 46 normally raised by plunger 47 and spring 48 in the housing. In this position, the pawl will hold the plunger in engaging relation with the board after the plunger has been forced toward the board by arm 33, it being evident that one edge of the flat surface on the pin cooperates with notch 39 for this purpose.

The transverse conveyor 49 comprises an endless chain having dogs 49' thereon adapted to engage the edge of the board to move the same over a plurality of spaced rollers 50. Associated with conveyor 49 is a suitable frame 51 having at its upper end the laterally spaced rollers 50' acting as a guide to permit transfer of the boards over the rollers while the boards are vertically disposed thereon. Pivoted at 52 adjacent the top of frame 51 are a pair of latch members 53, each having an inclined face 54 thereon, designed to permit the edge of the board to cam the latch upwardly to permit passage of the board. When the board has passed under the latches, the latter fall and prevent the board from falling away from the frame. At the same time, pawl 46 strikes frame 51 and is rocked to free the edge of face 45 from notch 39. Spring 41 then retracts the plunger, shoulder 40 abutting the housing to limit its retraction.

In operation, the transfer arms oscillate continuously, being driven by the connecting rod 24 pivoted to the gear 23. Gear 23 is secured to a shaft 55 which also carries a limit switch 56, as shown in Figure 1. The switch 56 momentarily energizes the solenoid 31 when the transfer arms 22 have reached their lowermost position and the forward edge of the board has been advanced to lie on guides 22; thereby rocking arms 33 to force plunger 34 into engaging relation with the board. The plungers remain in board clamping position during the upward swing of the arms, being held by cross pins 43. After the arms reach their uppermost position, the pawls release the clamps and latches 53 prevent the board from falling from their vertical position on the transverse conveyor. The latter then moves the board laterally away from the main conveyor, the arms descend to pick up another board, and the operation is repeated. The oscillation of the elevating arms and energization of the solenoid are so timed with respect to movement of the main conveyor, that the clamping means are actuated only when the board is in juxtaposed relation to the arms and the forward edge of the board is on guides 22'. It is obvious, therefore, that the cycle may be carried out continuously.

While a preferred form of the invention has been illustrated, modifications thereof are contemplated within the definitions of the invention as set forth in the following claims.

What I claim as my invention is:

1. In a conveyor of the class described, a traveling element adapted to support a substantially flat member horizontally thereon, oscillating means for elevating the member to a substantially vertical position, means on said elevating means adapted to engage the member while the latter is in horizontal position on the traveling conveyor, and to release the member when in substantially vertical position, means for moving said member engaging means laterally in one direction to clear the member during lowering of said oscillating means, and other means for moving said engaging means in the opposite direction into position to engage the under side of said member after the engaging means is positioned below said member.

2. In a conveying system of the class described, a traveling element, means on said element for supporting flat members horizontally thereon, a second traveling element arranged to travel substantially at right angles to said first mentioned traveling element, means associated with said second element for maintaining said article in vertical position, means for transferring an article from said first-mentioned element to said second element including a pair of oscillatable arms, means on said arms adapted to successively engage the flat members while the latter are in horizontal position, means for moving said member engaging means laterally in one direction to clear the member during lowering of said oscillating means, and other means for moving said engaging means in the opposite direction into position to engage the under side of said member after the engaging means is positioned below said member, said means being adapted to lift the article from horizontal to vertical position during transfer.

3. In a conveying system of the class described, a first conveyor adapted to support an article horizontally thereon, a second conveyor adjacent one end of the first conveyor and adapted to support an article vertically thereon, an oscillating arm disposed between said conveyors and adapted to elevate an article from the first conveyor to the second conveyor, means on said arm for gripping an article while the article is in horizontal position, a solenoid for moving said means to member gripping position, a latch for holding said means in member gripping position, and means for releasing the article in vertical position on the second conveyor.

4. In a conveying system of the class described, a first conveyor adapted to support an article horizontally thereon, a second conveyor adjacent one end of the first conveyor and adapted to support an article vertically thereon, a pair of oscillating arms adapted to be rocked to juxtaposed relation with the sides of said first conveyor at said end thereof, means on each arm movable into gripping relation with an article on said first conveyor when the arms are in said position, solenoids for moving said means into gripping relation with said article, means for operating said solenoids in timed relation with said first conveyor, means for moving said gripping means laterally to clear the article during lowering of said arms, means for oscillating said arms in timed relation with said first conveyor and means for releasing the article when said arms are rocked to vertical position to deposit the article on said second conveyor.

5. A transfer mechanism comprising a pivoted arm, means for oscillating said arm between horizontal and vertical positions thereof, a reciprocable article engaging member on said arm, a solenoid for moving said engaging member into article engaging position when the arm is at the lower limit of its oscillation, means associated with said oscillating means for periodically energizing said solenoid, means for moving said engaging means to clear the article being transferred while the arm is descending, and means for releasing said article engaging member when the arm is at the other limit of its oscillation.

6. In a conveying system of the class described, a continuously moving first conveyor adapted to support a flat member horizontally thereon, a second conveyor adjacent one end of the first conveyor and adapted to support a flat member vertically thereon, a transfer arm oscillating continuously in timed relation to said first conveyor, means on said arm for engaging a flat member, a solenoid for moving said means into member engaging position when the member is horizontal, means for moving said engaging means to clear the article being transferred while the arm is descending, and means for releasing the flat member when the arm is rocked to vertical position to deposit the member on said second conveyor.

7. In a conveying system of the class described, a continuously moving first conveyor adapted to support a substantially flat member horizontally thereon, a second conveyor adapted to support a substantially flat member vertically thereon, a transfer arm oscillating continuously in timed relation to said first conveyor, means on said arm for gripping a flat member, a solenoid for moving said means into member gripping position when the member is horizontal, a latch for holding said means in member gripping position while the arm is rocked to vertical position, and means associated with said second conveyor to release the latch to deposit the member on said second conveyor.

8. A transfer mechanism comprising a pivoted arm, means on said arm for gripping an article when the arm is in one relative position thereof, a solenoid for moving said means to member gripping position, a latch for holding said means in member gripping position while the arm is rocked, and means for releasing the latch when the arm is in another relative position thereof.

9. A transfer mechanism comprising a pivoted arm, means on said arm for gripping an article when the arm is in one relative position thereof, a solenoid for moving said means to member gripping position, a latch for holding said means in member gripping position while the arm is rocked, means positioned to engage said latch to release the same when the arm is in another relative position thereof, and spring means for returning said gripping means to inoperative position when said latch is released to release the article from the pivoted arm.

10. In a conveying system of the class described, a traveling element adapted to support a flat member thereon, a second traveling element adapted to support a flat article thereon in a different angular position, a pivoted transfer arm moving between said first and second mentioned traveling elements, means on said arm for gripping a flat member, a solenoid arranged to move said means into member gripping position when said transfer arm is adjacent said first mentioned traveling element, a latch for holding said means in member gripping position while the transfer arm is rocked toward the second mentioned traveling element, and means associated with said second mentioned traveling element to release the latch when said transfer arm is adjacent said second mentioned traveling element to deposit the flat member thereon.

11. A transfer mechanism comprising a pivoted arm for transferring a flat article from horizontal position to vertical position, means for oscillating said arm between horizontal and vertical positions thereof, a reciprocable article engaging member on said arm, means for moving said engaging member into position to engage the article while the latter is in horizontal position, means for holding said member in engaging relation with the article during elevation of the arm, means for releasing said engaging member when the article has been transferred to its vertical position, and means for moving said engaging member to and maintaining the member in a position to clear a horizontally positioned article during the descending movement of the arm.

LEONARD J. BISHOP.